: 3,023,220
Patented Feb. 27, 1962

3,023,220
PROCESS OF PREPARING ANTHRAMID VAT DYESTUFF
Joseph S. Milazzo, Palisades Park, N.J., assignor to General Aniline & Film Corporation, New York, N.Y., a corporation of Delaware
No Drawing. Filed Oct. 22, 1959, Ser. No. 847,879
2 Claims. (Cl. 260—316)

This invention relates to an anthamid vat dyestuff and particularly to an improved process of preparing Indanthrene Olive R (yellow shade).

It is known that an olive-gray vat dyestuff can be prepared by the treatment of dibenzoyl-p-p'-diamino-α-α'-di-anthramid with concentrated sulfuric acid. The procedure which is more fully disclosed in United States Patent 996,109 involves the heating of 1 part of the said di-anthramid with 10 parts of 66° Be. sulfuric acid with stirring to 30–35° C. until the mass has assumed a brown coloration. 10 parts of a 40% fuming sulfuric acid are then added and the mixture poured on ice. The dye, which separates in the shape of olive-green flakes, is filtered off and then washed with water.

It is also known that in the preparation of the anthramid dye by carbazolation, ring closure is resorted to by treatment with sulfuric acid at low temperatures i.e., below 15°–25° C.; Chemistry of Synthetic Dyes and Pigments by H. A. Lubs, page 464. The low temperatures are employed to prevent hydrolysis of the benzamido groups and to eliminate low yields and low dyeing strength of the olive-gray dyestuff.

I have made the surprising discovery that the anthramid dyestuff can be readily prepared in a much more facile and economical manner by conducting the carbazolation, ring closure, at 20°–25° C. and eliminating the use of 40% fuming sulfuric acid. After the ring closure is complete, indicated by a color change in sulfuric acid from yellow green to golden brown, water is added as the temperature rises to 60°–65° C. but not over 80–85° C. to give a microcrystalline product when examined under the microscope. The acid mixture is then precipitated in water and given a sodium bichromate purification. Then, the purified dyestuff is filtered, washed neutral. The dyestuff produced dyes cotton from an alkaline hydrosulfite vat fast olive-gray shade substantially yellower than Indanthrene Olive RAP Dbl pst new; Color Index 1150. This discovery is of great economic significance since the uses of Indanthrene Olive R are numerous, such as in self shades and also in mixed browns which make for considerable reduction in the cost of producing the mixed browns.

In accordance with the present invention, it is interesting to note that when the sulfuric acid concentration is reduced by the water addition to about 80–85% (after the carbazolation step), no hydrolysis of the benzamido groups were noticed since high yields were obtained (about 95% of theory based on color value). All fastness properties, chlorine, light and wash are excellent when compared to Ind. Olive RAP Dbl pst new; Color Index 1150.

The following examples will more fully describe the improved process of the present invention. All parts given are by weight.

*Example I*

1 part of 1,1'-iminobis-(4-benzoylamino anthraquinone) produced by condensing benzoyl chloride and 1,1'-imidobis (4-aminoanthraquinone) was stirred at 20°–25° C. with 10 parts of sulfuric acid 96%. Stirring at 20–25° C. was continued for 1 hour or until a golden brown coloration was observed. When carbazolation was complete, as indicated by a color change from yellow green to golden brown, 1.3–1.6 parts of water were added as the temperature rose to 60°–65° C. but not over 80°–85° C. After the water addition was made, the mixture was stirred at 60°–65° C. for 2 hours. The mass was then poured into 36–40 parts of water to precipitate the dyestuff. The mixture was heated to 60°–85° C. and purified by adding 0.25 part of sodium bichromate. It is then filtered and washed neutral with water. The dyestuff obtained dyes cotton an olive shade with a yellow cast (substantial) when compared to Indanthrene Olive RAP Dbl Pst new; Color Index 1150.

*Example II*

1 part of 1,1'-iminobis-(4-benzoylamino anthraquinone) produced by condensing benzoyl chloride and 1,1'-iminobis (4-aminoanthraquinone) was stirred at 20°–25° C. with 10 parts of sulfuric acid 96%. Stirring at 20°–25° C. was continued for 1 hour or until a golden brown coloration was observed. When the carbazolation was complete, as indicated by a color change from yellow green to golden brown, 1.3–1.6 parts of water were added below 20° C. After the water addition, the mixture was heated to 60°–65° but not over 80°–85° C. and held for 2 hours. The mass was then poured into 36–40 parts of water to precipitate the dyestuff. The mixture was heated to 60°–85° C. and purified by adding 0.25 part of sodium bichromate. It was then filtered and washed neutral with water. The dyestuff obtained dyes cotton an olive shade with a yellow cast (substantial) when compared to Indanthrene Olive RAP Dbl pst new; Color Index 1150.

*Example III*

1 part of 1,1'-iminobis-(4-benzoylamino anthraquinone) produced by condensing benzoyl chloride and 1,1'-iminobis (4-aminoanthraquinone) was stirred at 20°–25° C. with 10 parts of sulfuric acid 96%. Stirring 20°–25° C. was continued for 1 hour or until a golden brown coloration was observed. When the carbazolation was complete, indicated by a color change from yellow green to golden brown, 1.3–1.6 parts of water were added below 20° C. After the water addition, the mixture was heated to 35°–65° C. and 0.14 part of manganese dioxide added. The mixture was stirred at 35°–65° C. for 2–4 hours. The resulting mass was poured into 36–40 parts of water to precipitate the dyestuff. The mixture was heated to 60°–85° C. and purified by adding 0.25 part of sodium bichromate. It was then filtered and washed neutral with water. The dyestuff obtained dyes cotton an olive shade with a yellow cast (substantial) when compared to Ind. Olive RAP Dbl pst new; Color Index 1150.

I claim:

1. The process of preparing 1,2,7,8-diphthaloyl-3,6-di-(benzoylamino)-carbazole vat dyestuff which consists treating 1,1'-iminobis - (4 - benzoylaminoanthraquinone) with 96% sulfuric acid at about room temperature for a period of time to yield a golden-brown coloration, adding sufficient water as the temperature rises to between 60–85° C. to yield a microcrystalline product, precipitating the sulfuric acid mixture in water and adding sodium bichromate to purify the same followed by isolation of the purified vat dyestuff by filtration.

2. The process of preparing 1,2,7,8-diphthaloyl-3,6-di-(benzoylamino) carbazole vat dyestuff which consists treating 1 part by weight of 1,1′-iminobis-(4-benzoylaminoanthraquinone) with 10 parts by weight of 96% sulfuric acid at about room temperature for a period of time to yield a golden-brown coloration, adding from 1.3 to 1.6 parts by weight of water, maintaining the temperature between 60–85° C., pouring the sulfuric acid mixture into water and adding 0.25 part by weight of sodium bichromate, and isolating the said dyestuff by filtration.

References Cited in the file of this patent

UNITED STATES PATENTS

| | | |
|---|---|---|
| 1,885,172 | Baumann | Nov. 1, 1932 |
| 2,278,973 | Carr | Apr. 7, 1942 |

FOREIGN PATENTS

| | | |
|---|---|---|
| 505,584 | Great Britain | May 12, 1939 |

OTHER REFERENCES

Venkataraman: Synthetic Dyes, vol. II, p. 900 (1952).